United States Patent
Jost et al.

(10) Patent No.: US 12,451,835 B2
(45) Date of Patent: Oct. 21, 2025

(54) AVOIDING ELECTROMAGNETIC INTERFERENCE (EMI) IN ELECTRICAL EQUIPMENT AND DRIVE SYSTEMS, E.G. USED IN RADIO ASTRONOMY

(71) Applicants: OHB Digital Connect GmbH, Bremen (DE); Max-Planck-Gesellschaft zur Förderung der Wissenschaften e.V., Munich (DE)

(72) Inventors: Matthias Jost, Mainz (DE); Pierre Dubois-Dit-Bonclaude, Mainz (DE); Jens Gotta, Mainz (DE); Christian Leinz, Burgbrohl (DE); Christoph Kasemann, Rheinbach (DE); Gundolf Wieching, Bonn (DE)

(73) Assignees: OHB Digital Connect GmbH, Bremen (DE); Max-Planck-Gesellschaft zur Forderung der Wissenschaften e.V., Munich (DE)

( * ) Notice: Subject to any disclaimer, the term of this patent is extended or adjusted under 35 U.S.C. 154(b) by 204 days.

(21) Appl. No.: 18/018,499

(22) PCT Filed: Jul. 27, 2020

(86) PCT No.: PCT/EP2020/071101
§ 371 (c)(1),
(2) Date: Jan. 27, 2023

(87) PCT Pub. No.: WO2022/022799
PCT Pub. Date: Feb. 3, 2022

(65) Prior Publication Data
US 2023/0318515 A1 Oct. 5, 2023

(51) Int. Cl.
*H02P 6/18* (2016.01)
*H02M 1/12* (2006.01)
(Continued)

(52) U.S. Cl.
CPC ............ *H02P 29/50* (2016.02); *H02M 1/123* (2021.05); *H02M 1/44* (2013.01); *H02P 6/183* (2013.01)

(58) Field of Classification Search
CPC ....... H02P 29/50; H02M 1/123; H02M 1/126; H02M 1/44
See application file for complete search history.

(56) References Cited

U.S. PATENT DOCUMENTS 7,511,443 B2 * 3/2009 Townsend ................ B25J 15/10
700/250
10,476,381 B1 * 11/2019 Sartler .................. H03H 7/0115
(Continued)

FOREIGN PATENT DOCUMENTS

WO WO 2011148642 A1 12/2011

OTHER PUBLICATIONS

Bergano et al., "EMI apparatus performance of a fully steerable radio telescope," 2nd URSI AT-RASC, Gran Canaria, May 28-Jun. 1, 2018. (2 pages).
(Continued)

*Primary Examiner* — Rina I Duda
(74) *Attorney, Agent, or Firm* — Seed Intellectual Property Law Group LLP

(57) ABSTRACT

The invention relates to a drive system for sensitive devices, in particular for radio astronomical devices, the drive system comprising an electric motor, a converter configured to supply a drive power to the electric motor and to control a rotational speed and/or rotational position of the electric motor, a power supply line for providing the electric motor with a drive power, and a signal line for providing the converter with a signal indicating a measured rotational speed and/or rotational position of the electric motor, wherein the drive system further comprises a shaft ground-
(Continued)

ing element for grounding a drive shaft of the electric motor and wherein at least one of the power supply line and the signal line further comprises a line filter unit for filtering electromagnetic interference (EMI) signals.

19 Claims, 2 Drawing Sheets

(51) Int. Cl.
*H02M 1/44* (2007.01)
*H02P 29/50* (2016.01)

(56) References Cited

U.S. PATENT DOCUMENTS

| | | |
|---|---|---|
| 10,483,902 B1 | 11/2019 | Sizov et al. |
| 2008/0187147 A1* | 8/2008 | Berner ............. G10K 11/17823 381/71.3 |
| 2012/0068655 A1 | 3/2012 | Inuduka et al. |
| 2014/0091622 A1* | 4/2014 | Lucas ..................... H02P 6/17 318/400.04 |
| 2015/0253052 A1* | 9/2015 | Sauer ..................... H02J 9/062 318/400.3 |
| 2017/0047881 A1* | 2/2017 | Shimura ............... F04B 49/065 |
| 2018/0007785 A1* | 1/2018 | Kamikura ............... H02M 7/48 |
| 2018/0342973 A1* | 11/2018 | Li .......................... H02K 11/40 |
| 2019/0081538 A1* | 3/2019 | Nye ..................... H01R 39/025 |

OTHER PUBLICATIONS

Zhang et al., "EMC design for actuators in the FAST reflector," *Research in Astronomy and Astrophysics* 18(4):48-1-48-6, Apr. 2018. (7 pages).
Jessner et al., "EMI Protection and Threshold Levels for the SKA," Technical Report, Jul. 2014, 72 pages.
Jonas et al., "The MeerKAT Radio Telescope," Rhodes University, SKA South Africa, MeerKAT Sceinces: On the Pathway to the SKA, May 25-27, 2016, 23 pages.
Wikipedia, "Ferrite bead," retrieved on Aug. 12, 2025, from <https://en.wikipedia.org/wiki/Ferrite_bead,> 3 pages.

* cited by examiner

AVOIDING ELECTROMAGNETIC INTERFERENCE (EMI) IN ELECTRICAL EQUIPMENT AND DRIVE SYSTEMS, E.G. USED IN RADIO ASTRONOMY

TECHNICAL BACKGROUND

Radio astronomical devices are exceptionally sensitive in order to detect weak signals from remote extraterrestrial objects. Therefore, they are also exceptionally prone to noise from electromagnetic interferences (EMI) emitted by electrical equipment, in particular by electrical drive systems with servo converters.

Known solutions for reducing or shielding EMI emissions from electrical equipment are not able to reduce the EMI emissions to the level required in radio astronomy. Hence, the objective of the present invention is to provide a drive system meeting the requirements of radio astronomical devices in terms of EMI emissions in order to improve the integrity of signals detected by radio astronomical devices.

DISCLOSURE OF THE INVENTION

The drive system according to the invention comprises a first motor, a first converter configured to supply a first drive power to the first motor and to control a rotational speed and/or a rotational position of the first motor, a first power supply line for providing the first motor with the first drive power, and a first signal line for providing the first converter with a signal indicating a measured rotational speed and/or a measured rotational position of the first motor, wherein the drive system comprises a shaft grounding element for grounding a drive shaft of the first motor and wherein at least one of the first power supply line and the first signal line further comprises a line filter unit being a low-pass filter for filtering electromagnetic interference signals.

Electric motors operated by servo converters cause electrical discharges between the rotating shaft and the fixed housing due to the control signals and the internal structure of the motor, resulting in high-energy, high-frequency disturbances or even spark discharges. Such disturbances can spread to the converter, even via shielded electrical lines. Grounding of the motor shaft turned out to be an effective means to reduce EMI emissions from sparking and the associated radiation of drive systems in radio astronomy and is applied for the first time to reduce EMI emissions by the present invention.

As the power electronics and the motors of a drive system are usually spaced apart from each other and connected by electrical power supply lines, highly interfering signals are emitted (e.g. 3-phase 400V continuously pulse-width modulated (PWM) power supply lines of the drive motors). The EMI emissions of such r supply lines can be reduced by using filters particularly developed for the corresponding application.

Different filters are required for the low-frequency, pulse-modulated and for the high-frequency signal components created by electronics. High-frequency the converter interferences, which are only generated in the motor due to the low-frequency PWM signals, can be fed back directly to the power module of the servo converter. High-frequency signals, which are generated in the converter or in the safety electronics, require a low-pass filter with v a low blocking frequency and a high blocking attenuation to prevent propagation. Both filters can be used cascaded.

Experiments revealed that a combination of shaft grounding and low-pass filters contributes synergistically to reducing EMI emissions, especially when the filter blocks frequencies above 30 MHz or preferably above 8 MHz. As a result, the signals detected by the radio astronomical device are less prone to noise, thereby improving the quality and integrity of the detected signals.

The shaft grounding element comprises preferably a sliding contact element configured to enable electrical contact between the drive shaft of the first motor and the shaft grounding element while the drive shaft of the first motor is being moved in relation to the sliding contact element.

Using a sliding contact element is an effective and efficient means to connect the drive shaft with the shaft grounding element while not obstructing the relative movement of the drive shaft. The sliding contact element can further be equipped with a roller or the like to establish electrical contact with the drive shaft while reducing the friction between the sliding contact element in the drive shaft during the relative movement.

The shaft grounding element for grounding the drive shaft of the first motor can also be provided in the first motor, preferably by establishing electrical conductivity between the drive shaft and the grounded casing of the first motor.

As casings of electric motors are usually grounded already, grounding the drive shaft via the motor casing is easy to implement and therefore rather cost efficient.

It is further preferred that at least the first power supply line comprises an all-pole sine filter for smoothening the PWM signal from the first converter, in particular by blocking frequencies below 4 MHZ, preferably below 10 MHZ.

The line filter unit and/or the first converter can further comprise a feedback module configured to add, to a signal of the first drive power, high-frequency feedback signals for reducing and/or cancelling high-frequency interference signals generated by the first motor.

By adding essentially inverted high-frequency signals to the high-frequency signals transmitted in the first power supply line, both high-frequency signals essentially cancel each other out, resulting in a smoother signal, which in turn causes less EMI emissions.

It is preferred that the first converter is accommodated in a first cabinet being electrically conductive and having at least one cabinet door provided in an opening of the first cabinet, wherein an electrically conductive element is provided to enable electrical contact between the cabinet door and the rest of the first cabinet when the cabinet door is in a closed state.

EMI emitting components are preferably installed in a closed cabinet with high shielding attenuation in order to maintain a self-contained, shielded, spatially limited space known as a Faraday cage. Structural measures like reinforcement frames on openings holding filtering components are important measures for achieving good surface properties, high contact pressures, low-resistance electrical connections, and as a result, effective EMI shielding.

Conductive sealing material on the door and attached flanged components increase reliability and reproducibility. Highly interfering systems such as safety electronics, motion control computers or power and control electronics of the motors should therefore be installed in such cabinet.

The electrically conductive element is preferably provided to enable continuous electrical contact between the cabinet door and the rest of the first cabinet while the electrically conductive element preferably comprises a copper-beryllium alloy.

By enabling continuous electrical contact between the cabinet door and the rest of the first cabinet, a reasonable shielding effect can be achieved even when the cabinet door is not entirely closed. Copper-beryllium alloys feature a good electrical conductivity and various hardness levels and are, therefore, well suited for forming the electrically conductive contact element.

It is further preferred that at least the first signal line and/or at least the first power supply line is guided from an interior portion of the first cabinet to an outside portion of the first cabinet via at least one opening, in which the line filter unit for filtering electromagnetic interference signals is provided.

Electrical connections between devices, assemblies or system components can be established via filters to maintain the shielding effect of the cabinet as well as of individual assemblies and to avoid interferences spreading via electrical connections (wired EMI). The filtering components have a high blocking attenuation and a wide bandwidth and should not distort the intended signal. In case of interference sources with a high level of conducted interference, filter components can be connected in series.

The line filter unit is preferably configured to filter frequencies in a range between 8 MHz and 18000 MHZ with a blocking attenuation of at least 60 dB, preferably at least 100 dB. Experiments have revealed that corresponding filters can reduce EMI emissions very effectively.

Furthermore, a plurality of line filter units can be sequentially arranged at least in the first signal line and/or the first power supply line. The sequential arrangement of line filter units helps to further reduce high-frequency signals, thereby further reducing EMI emissions.

In another embodiment, the drive system further comprises at least an electro-magnetically shielded housing accommodating at least a limit switch for detecting an end position of an entity to be aligned, such as an antenna, a reflector, a telescope or the like, and/or at least a sensor such as a temperature and/or humidity sensor, and/or at least a position encoder for measuring a position of the motor and/or a position of the entity to be aligned.

Components for controlling and operating the drive system that cannot be accommodated within the shielded cabinet (like position encoders or limit switches) can be accommodated in separate housings with high EMI shielding attenuation. Electrical connections to these units can also be shielded and/or made EMI-compliant (e.g. via filters).

Preferably, at least one signal line and/or at least one power supply line of a housing is guided from an interior portion of the housing to an outside portion of the housing via at least one opening comprising a line filter unit for filtering electromagnetic interference signals is provided.

Guiding electrical signal and/or power supply lines through the walls of the shielded housing via filter units further reduces the EMI emissions outside the shielded housing.

It is further preferred that at least the first power supply line and/or at least the first signal line is electro-magnetically shielded. Shielding electric power and/or signal lines that run through non-shielded environments further reduces the EMI emissions outside the shielded environments.

It is further preferred that at least an optical signal line, such as an optical fiber line, is provided so as to enable optical signal transmission, preferably between at least one component accommodated in the housing and at least one component accommodated in the first cabinet. The optical signal line is preferably guided through the cabinet and/or housing via wave guides.

EMI emission is inherent in electrical communication. Therefore, all external communication (with I/O units, drive control or command transmission) should be based on optical fiber communication, which does not emit any EMI radiation. For the same reason, line filters or electro-magnetic shieldings are not provided for optical signal lines.

In a particular embodiment, the drive system is part of a telescope that further comprises a support structure and a reflector and is configured such that the reflector is rotatable around a substantially vertical axis and/or around a substantially horizontal axis by means of the drive system.

As telescopes are exceptionally sensitive and prone to noise caused by EMI emissions from electrical equipment, the EMI-optimized electrical drive system disclosed herein is particularly suitable to be used in telescopes since the reduction of interfering signals significantly improves the quality of the detected signals.

DETAILED DESCRIPTION OF THE DRAWINGS

Figure 1:
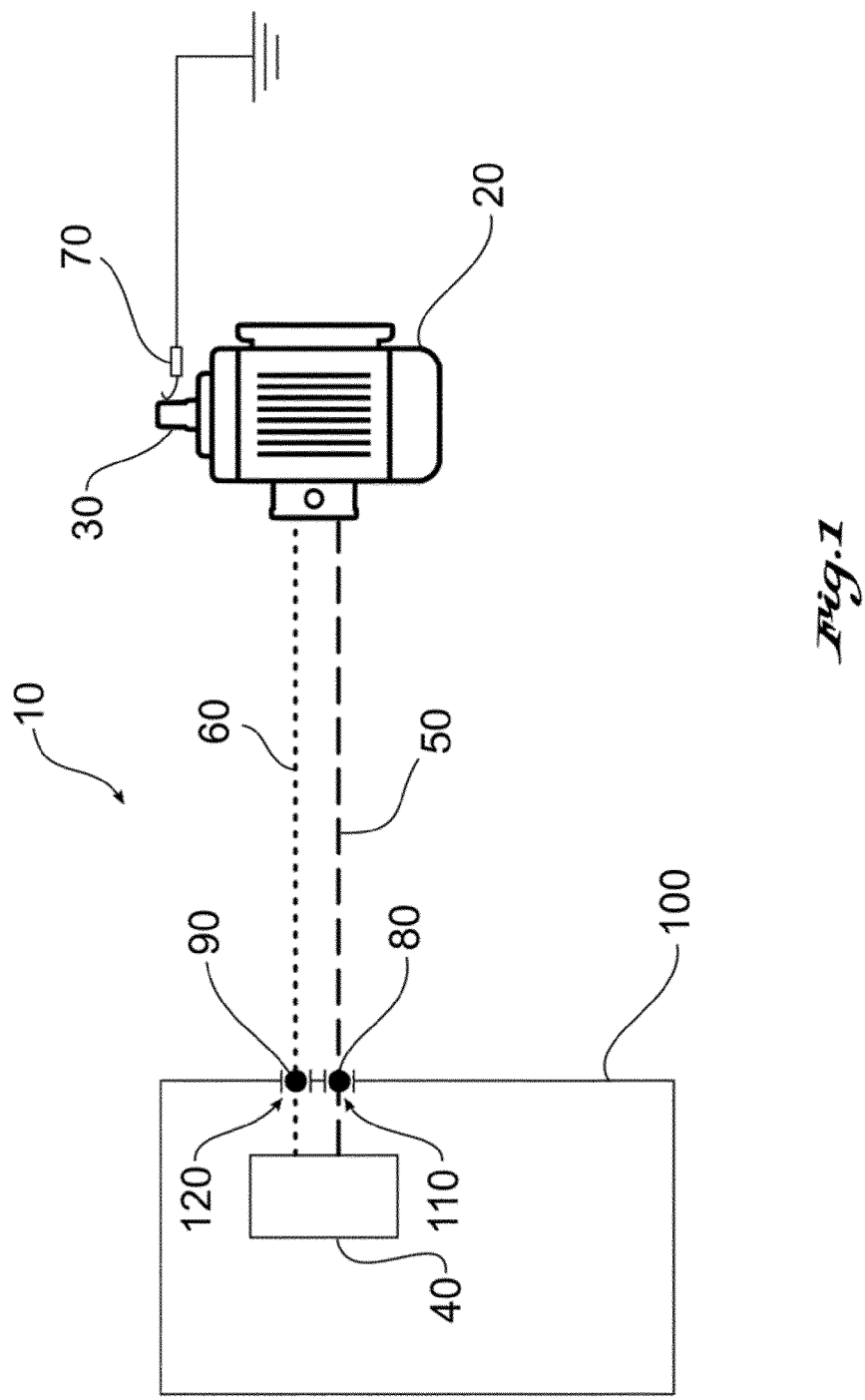
FIG. 1 is a schematic view of a drive system according to a basic embodiment of the invention

FIG. 1 shows an embodiment of a drive system 10 according to the invention consisting of an electrical motor 20 with a drive shaft 30, which is controlled by a converter 40 via a power supply line 50 and a signal line 60. The drive shaft 30 is grounded via a shaft grounding element 70. The power supply line 50 and the signal line 60 comprise filter units 80 and 90, respectively, which are provided in openings 110,120 of a cabinet 100 accommodating the converter 40.

Figure 2:
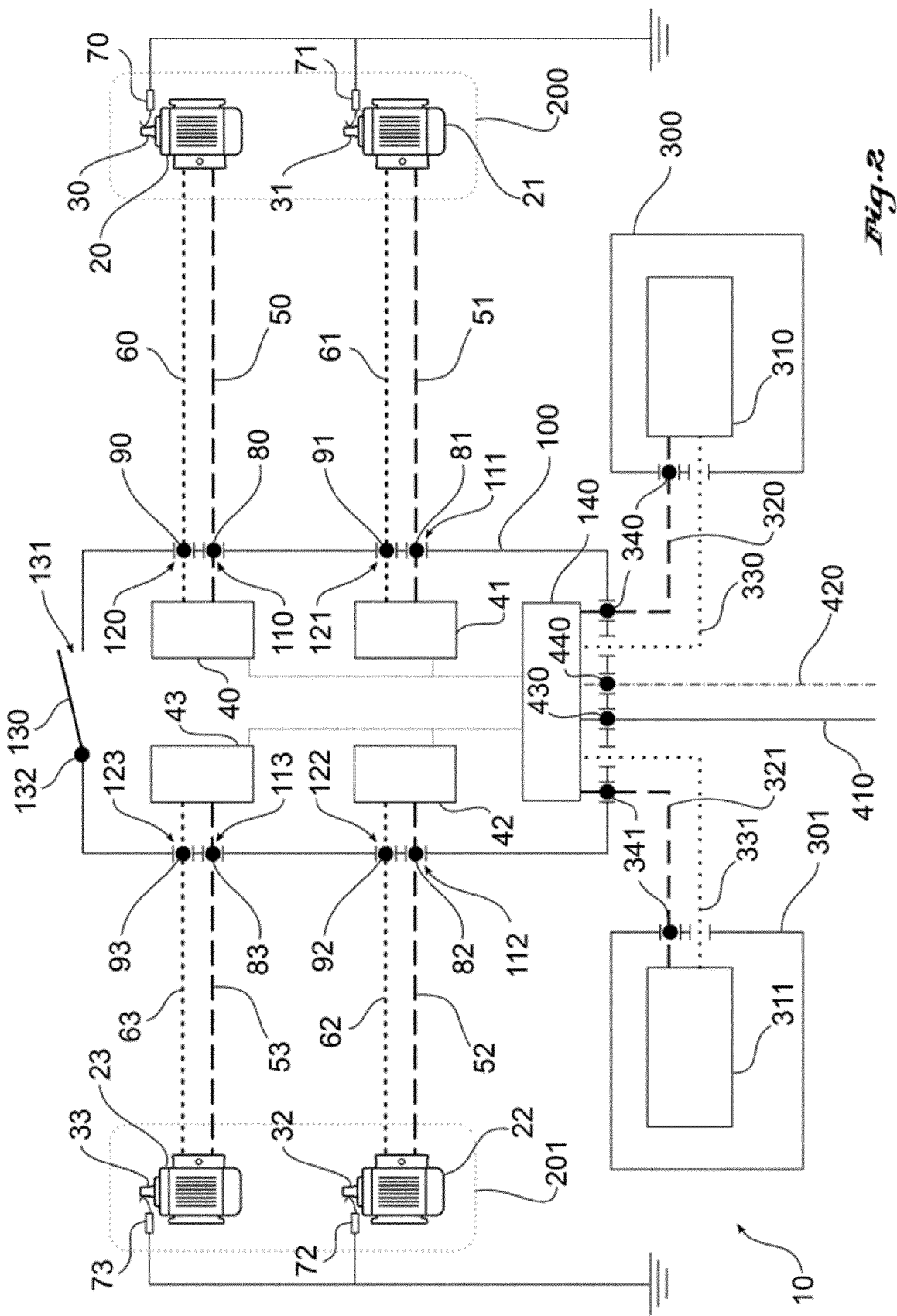
FIG. 2 is a schematic view of a drive system according to a more complex embodiment of the invention

FIG. 2 shows another embodiment of a drive system 10 according to the invention with multiple components. The embodiment shown in FIG. 2 comprises four electrical motors 20-23 with respective drive shafts 30-33. Each electrical motor 20-23 is connected with a converter 40-43 via a power supply line 50-53 and a signal line 60-63 and each drive shaft 30-33 is grounded via a shaft grounding element 70-73.

The four converters 40-43 are accommodated in an electro-magnetically shielded cabinet 100 and the power supply lines 50-53 and signal lines 60-63 leading to the respective electrical motors 20-23 are guided through openings 110-113/120-123 in the shielded cabinet 100 via corresponding filter units 80-83/90-93, respectively. The shielded cabinet 100 further comprises an opening 131 and a door 130. An electrically conductive element 132 is provided so as to enable electrical contact between the cabinet 100 and the door 130.

In this embodiment, the shielded cabinet 100 further comprises a control unit 140, which is configured to control the converters 40-43 as well as two external units 310, 311, like switches, sensors, and/or encoders, that are located outside the cabinet 100 and accommodated in separate electro-magnetically shielded housings 300,301. Preferably, the electric motors 20-23 are also accommodated in electro-magnetically shielded housings 200,201.

The control unit 140 is connected with the external units 310, 311 via respective power supply lines 320, 321 and optical signal lines 330,331 and is supplied itself by corresponding power and signal lines 410 and 420, respectively, from the outside of the shielded cabinet. The openings for the power supply lines 320,321 in the shielded cabinet 100 and in the shielded housings 300,301, as well as the openings in the shielded cabinet 110 for the power and signal lines 410 and 420, respectively, supplying the control unit 140, are equipped with corresponding filters 340, 341, 430, 440.

The use of electro-magnetic shieldings 100, 200, 201, 300, 301, line filters 80-83,90-93, 340, 341, 430, 440 and optical signal lines 330,331 in combination with shaft grounding elements 70-73, allows to reduce the EMI emissions to a minimum.

REFERENCE LIST

10 drive system
20-23 electric motor
30-33 drive shaft
40-43 converter
50-53 power line (for motor)
60-63 signal line (for motor)
70-73 shaft grounding element
80-83 filter unit (for motor power line)
90-93 filter unit (for motor signal line)
100 cabinet
110-113 cabinet opening (for motor power line)
120-123 cabinet opening (for motor signal line)
130 cabinet door
131 cabinet door opening
132 electrically conductive element
140 control unit
200,201 housing (for motor)
300,301 housing (for external unit)
310,311 external unit
320,321 power line (for external unit)
330,331 filter unit (for external unit power line)
340,341 optical signal line (for external unit)
410 power line (for control unit)
420 signal line (for control unit)
430 filter unit (for control unit power line)
440 filter unit (for control unit signal line)

The invention claimed is:

1. A drive system for sensitive devices used in radio astronomy, the drive system comprising:
a first motor;
a first converter configured to supply a first drive power to the first motor;
a control unit configured to control a rotational speed and/or a rotational position of the first motor;
a first power supply line for providing the first motor with the first drive power; and
a first signal line for providing the control unit with a signal indicating a measured rotational speed and/or a measured rotational position of the first motor,
wherein the drive system further comprises a shaft grounding element for grounding a drive shaft of the first motor,
wherein each one of the first power supply line and the first signal line further comprises a line filter unit being a low-pass filter for filtering electromagnetic interference signals by blocking frequencies higher than 30 MHz, and
wherein the shaft grounding element comprises a sliding contact element configured to enable electrical contact between the drive shaft of the first motor and the shaft grounding element while the drive shaft of the first motor is moved relative to the sliding contact element.

2. The drive system of claim 1, wherein the shaft grounding element for grounding the drive shaft of the first motor is provided in the first motor.

3. The drive system of claim 1, wherein at least the first power supply line further comprises an all-pole sine filter for smoothening a PWM signal from the first converter by blocking frequencies lower than 4 MHz.

4. The drive system of claim 1, wherein the line filter unit and/or the first converter further comprises a feedback module configured to add, to a signal of the first drive power, high-frequency feedback signals for reducing and/or cancelling high-frequency interference signals generated by the first motor.

5. The drive system of claim 1, wherein the first converter is accommodated in a first cabinet being electrically conductive and having at least one cabinet door provided in an opening of the first cabinet, wherein an electrically conductive element is provided so as to enable electrical contact between the cabinet door and the rest of the first cabinet when the cabinet door is in a closed state.

6. The drive system of claim 5, wherein the electrically conductive element is provided so as to enable continuous electrical contact between the cabinet door and the rest of the first cabinet.

7. The drive system of claim 5, wherein at least one of the first power supply line and the first signal line is guided from an interior portion of the first cabinet to an outside portion of the first cabinet via at least one opening, wherein the line filter unit is provided in the at least one opening.

8. The drive system of claim 1, wherein the line filter unit is configured to filter frequencies in a range between 8 MHz and 18000 MHz, wherein a blocking attenuation of the line filter unit is at least 60 dB.

9. The drive system of claim 1, wherein a plurality of line filter units are sequentially arranged at least in in one of the first power supply line and the first signal line and/or at least in one of a power supply line and a signal line of the control unit.

10. The drive system of claim 1, further comprising at least an electromagnetically shielded housing accommodating at least one of: a limit switch for detecting an end position of an entity to be aligned, optionally selected from an antenna, a reflector, and a telescope; a sensor optionally selected from a temperature and/or humidity sensor; a position encoder for measuring a position of the motor and/or a position of the entity to be aligned.

11. The drive system of claim 10, wherein at least one of a power supply line and a signal line of a housing is guided from an interior portion of the housing to an outside portion of the housing via at least one opening, wherein a line filter unit is provided in the at least one opening.

12. The drive system of claim 1, wherein at least one of the first power supply line and the first signal line and/or at least one of a power supply line and a signal line of a housing and/or at least one of a power supply line and a signal line of the control unit or a cabinet is electromagnetically shielded.

13. The drive system of claim 1, wherein at least one of the first signal line and a signal line of a housing is an optical signal line, which is guided through a cabinet and/or a housing via wave guides.

14. A telescope comprising a support structure, a reflector, and the drive system of claim 1, the telescope being configured such that the reflector is rotatable around a substantially vertical axis and/or around a substantially horizontal axis by means of the drive system.

15. The drive system of claim 1, wherein the frequencies are higher than 8 MHz.

16. The drive system of claim 1, wherein the shaft grounding element for grounding the drive shaft of the first motor is provided in the first motor by establishing electrical conductivity between the drive shaft and a grounded casing of the first motor.

17. The drive system of claim 1, wherein at least the first power supply line further comprises an all-pole sine filter for smoothening a PWM signal from the first converter by blocking frequencies lower than 10 MHz.

18. The drive system of claim 5, wherein the electrically conductive element is provided so as to enable continuous electrical contact between the cabinet door and the rest of the first cabinet, and the electrically conductive element comprises a copper-beryllium alloy.

19. The drive system of claim 1, wherein the line filter unit is configured to filter frequencies in a range between 8 MHz and 18000 MHz, wherein a blocking attenuation of the line filter unit is at least 100 dB.

* * * * *